United States Patent
Min et al.

(10) Patent No.: US 12,488,859 B2
(45) Date of Patent: Dec. 2, 2025

(54) PEPTIDE BASED VACCINE GENERATION SYSTEM WITH DUAL PROJECTION GENERATIVE ADVERSARIAL NETWORKS

(71) Applicant: NEC Laboratories America, Inc., Princeton, NJ (US)

(72) Inventors: Renqiang Min, Princeton, NJ (US); Hans Peter Graf, South Amboy, NJ (US); Ligong Han, Edison, NJ (US)

(73) Assignee: NEC Corporation, Tokyo (JP)

( * ) Notice: Subject to any disclaimer, the term of this patent is extended or adjusted under 35 U.S.C. 154(b) by 824 days.

(21) Appl. No.: 17/711,310

(22) Filed: Apr. 1, 2022

(65) Prior Publication Data

US 2022/0328127 A1 Oct. 13, 2022

Related U.S. Application Data (60) Provisional application No. 63/170,712, filed on Apr. 5, 2021.

(51) Int. Cl.
*G16B 15/30* (2019.01)
*G06N 3/045* (2023.01)
*G06N 3/08* (2023.01)
*G16B 40/20* (2019.01)

(52) U.S. Cl.
CPC ............. *G16B 15/30* (2019.02); *G06N 3/045* (2023.01); *G06N 3/08* (2013.01); *G16B 40/20* (2019.02)

(58) Field of Classification Search
CPC ........ G16B 15/30; G16B 40/20; G16B 20/50; G06N 3/045; G06N 3/08; G06N 3/0464; G06N 3/047; G06N 3/0475; G06N 3/094
See application file for complete search history.

(56) References Cited

PUBLICATIONS

Li, Guangyuan, et al. "DeepImmuno: deep learning-empowered prediction and generation of." Improving cancer immunotherapy through the lens of single-cell genomics and neoantigen discovery 513 (2019) (Year: 2019).*

(Lin, Wei-Chao et al. "On Learning Dual Classifiers for Better Data Classification." Applied soft computing, 2015 (Year: 2015).*
Dabre, Raj, and Atsushi Fujita. "Softmax Tempering for Training Neural Machine Translation Models." arXiv (Cornell University) (2020) (Year: 2020).*
Van Oort, Colin M et al. "AMPGAN v2: Machine Learning-Guided Design of Antimicrobial Peptides." Journal of chemical information and modeling 61.5 (2021) (Year: 2021).*
DeepImmuno: Deep learning-empowered prediction and generation of immunogenic peptides for T cell immunity Guangyuan Li, Balaji Iyer, V. B. Surya Prasath, Yizhao Ni, Nathan Salomonis bioRxiv 2020.12.24.424262; doi: https://doi.org/10.1101/2020.12.24.424262 (Year: 2020).*
Pavel P. Kuksa et al., High-Order Neural Networks and Kernel Methods for Peptide-MHC Binding Prediction, Bioinformatics, 2015, pp. 1-7, vol. 00 No. 00, Oxford University Press.
Timothy J. O'Donnell et al., MHCflurry 2.0: Improved Pan-Allele Prediction of MHC Class I-Presented Peptides by Incorporating Antigen Processing, Cell Systems, Jul. 22, 2020,pp. 42-48, vol. 11, Elsevier Inc.
Timothy J. O'Donnell et al., MHCflurry 2.0: MHCflurry: Open-Source Class I MHC Binding Affinity Prediction, Cell Systems, Jul. 25, 2018, pp. 129-132, vol. 7, Elsevier Inc.

* cited by examiner

*Primary Examiner* — Soren Harward
*Assistant Examiner* — Dawn Bickham
(74) *Attorney, Agent, or Firm* — Vincent Duffy; Joseph Kolodka (57) ABSTRACT

A method generates new binding peptides to Major Histocompatibility Complex (MHC) proteins. The method includes training a Generative Adversarial Network (GAN) having a generator and a discriminator only on a set of binding peptide sequences given training data comprising the set of binding peptide sequences and a set of non-binding peptide sequences. A GAN training objective includes the discriminator being iteratively updated to distinguish generated peptide sequences from sampled binding peptide sequences as fake or real and the generator being updated to fool the discriminator. The GAN training objective is optimized while learning two projection vectors for a binding class with two cross-entropy losses. A first loss discriminates binding peptide sequences in the training data from non-binding peptide sequences in the training data. A second loss discriminates generated binding peptide sequences from non-binding peptide sequences in the training data. The method enables supporting decision-making related to new binding peptide generation.

19 Claims, 8 Drawing Sheets

PEPTIDE BASED VACCINE GENERATION SYSTEM WITH DUAL PROJECTION GENERATIVE ADVERSARIAL NETWORKS

RELATED APPLICATION INFORMATION

This application claims priority to U.S. Provisional Patent Application No. 63/170,712, filed on Apr. 5, 2021, incorporated herein by reference in its entirety.

BACKGROUND

Technical Field

The present invention relates to peptide based vaccine generation and more particularly to a peptide based vaccine generation system with dual projection Generative Adversarial Networks (GANs).

Description of the Related Art

Peptide-Major Histocompatibility Complex (MHC) protein interactions are essential in cell-mediated immunity, regulation of immune responses, and transplant rejection. Effective computational methods for peptide-MHC binding prediction will significantly reduce cost and time in clinical peptide vaccine search and design. Effective computational methods for peptide-protein binding prediction can greatly help clinical peptide vaccine search and design. Previous computational systems focus on predicting a binding interaction score between a MHC protein and a given peptide but are incapable of generating more binding peptides given existing positive binding peptide examples.

SUMMARY

According to aspects of the present invention, a computer-implemented method is provided for generating new binding peptides to Major Histocompatibility Complex (MHC) proteins. The method includes training, by a processor device, a Generative Adversarial Network GAN having a generator and a discriminator only on a set of binding peptide sequences given training data comprising the set of binding peptide sequences and a set of non-binding peptide sequences. A GAN training objective includes the discriminator being iteratively updated to distinguish generated peptide sequences from sampled binding peptide sequences as fake or real and the generator being iteratively updated to fool the discriminator. The training includes optimizing the GAN training objective while learning two projection vectors for a binding class with two cross-entropy losses. A first of the two cross-entropy losses discriminating binding peptide sequences in the training data from non-binding peptide sequences in the training data. A second of the two cross-entropy losses discriminating generated binding peptide sequences from non-binding peptide sequences in the training data.

According to other aspects of the present invention, a computer program product is provided for generating new binding peptides to Major Histocompatibility Complex (MHC) proteins. The computer program product includes a non-transitory computer readable storage medium having program instructions embodied therewith. The program instructions are executable by a computer to cause the computer to perform a method. The method includes training, by a processor device of the computer, a Generative Adversarial Network GAN having a generator and a discriminator only on a set of binding peptide sequences given training data comprising the set of binding peptide sequences and a set of non-binding peptide sequences. A GAN training objective includes the discriminator being iteratively updated to distinguish generated peptide sequences from sampled positive peptide sequences as fake or real and the generator being iteratively updated to fool the discriminator. The training includes optimizing the GAN training objective while learning two projection vectors for a binding class with two cross-entropy losses. A first of the two cross-entropy losses discriminating binding peptide sequences in the training data from non-binding peptide sequences in the training data. A second of the two cross-entropy losses discriminating generated binding peptide sequences from non-binding peptide sequences in the training data.

According to other aspects of the present invention, a computer processing system is provided for generating new binding peptides to Major Histocompatibility Complex (MHC) proteins. The computer processing system includes a memory device for storing program code. The computer processing system further includes a processor device, operatively coupled to the memory device, for running the program code to train a Generative Adversarial Network GAN having a generator and a discriminator only on a set of binding peptide sequences given training data comprising the set of binding peptide sequences and a set of non-binding peptide sequences. A GAN training objective includes the discriminator being iteratively updated to distinguish generated peptide sequences from sampled positive binding peptide sequences as fake or real and the generator being iteratively updated to fool the discriminator. During training, the processor device further runs the program code to optimize the GAN training objective while learning two projection vectors for a binding class with two cross-entropy losses. A first of the two cross-entropy losses discriminating binding peptide sequences in the training data from non-binding peptide sequences in the training data. A second of the two cross-entropy losses discriminating generated binding peptide sequences from non-binding peptide sequences in the training data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to a peptide based vaccine generation system with dual projection Generative Adversarial Networks (GANs).

Embodiments of the present invention train a GAN, for example a Wasserstein GAN, only on binding peptides and simultaneously maximizes the prediction accuracies of dual classifiers discriminating real/generated binding peptides from non-binding peptides.

Embodiments of the present invention employ tempering Softmax units with entropy regularization to effectively generate peptides with discrete amino acid symbols.

Embodiments of the present invention provide a new deep generative system for generating new binding peptides to MHC proteins based on a dataset that includes both MHC-binding peptides and non-binding peptides. Instead of predicting binding scores of a pre-defined set of peptides as done traditionally, the system of the present invention trains a "conditional" Generative Adversarial Network (GAN) on MHC-binding peptides with dual class label projections and a generator with tempering Softmax units.

Given a dataset that includes both binding and nonbinding peptide sequences interacting with MHC, embodiments of the present invention train a Wasserstein GAN (WGAN), which includes a generator and a discriminator, only on the binding peptide sequences. The generator is a deep neural network, which transforms a sampled latent code vector z from a standard multivariate unit-variance Gaussian distribution to a peptide feature representation matrix with each column corresponding to an amino acid. The discriminator is a deep neural network with convolutional layers and fully-connected layers between the input representation layer and the output layer that outputs a scalar as in standard WGAN. The parameters of the discriminator are updated to distinguish generated peptide sequences from binding peptide sequences in the training set. The parameters of the generator are updated to fool the discriminator. As used herein, "deep" refers to having one or more hidden layers.

Figure 1:
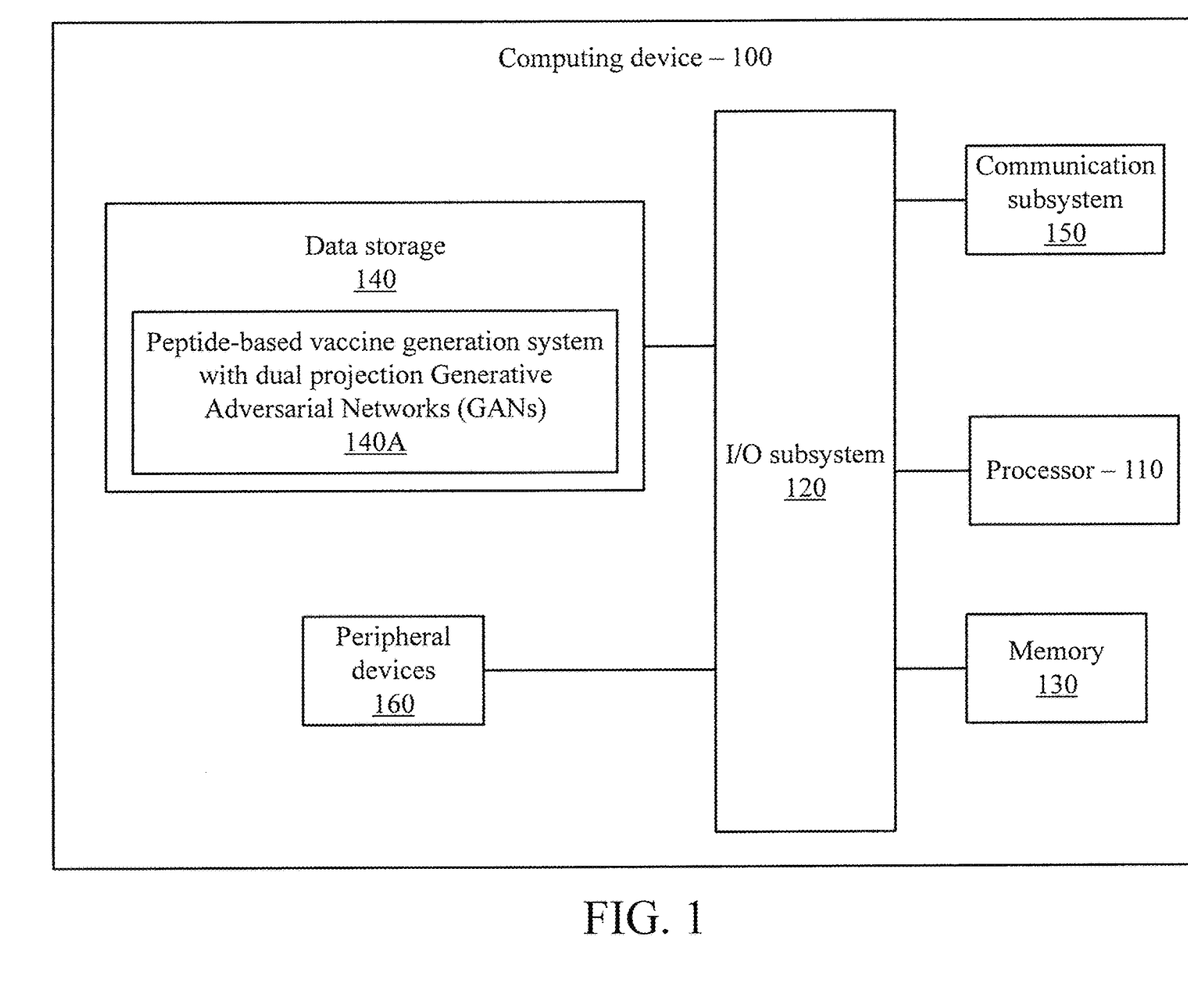
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured for peptide-based vaccine generation with dual projection Generative Adversarial Networks (GANs).

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for peptide-based vaccine generation with dual projection Generative Adversarial Networks (GANs). The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
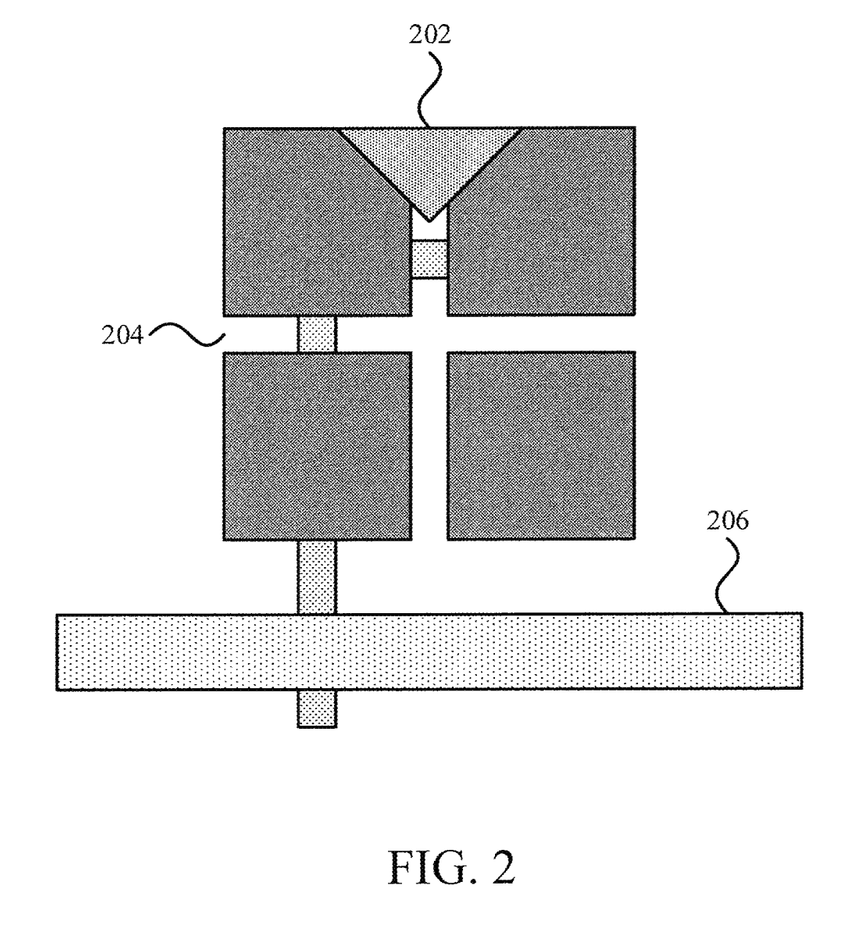
FIG. 2 is a block diagram illustrating a peptide and a major histocompatibility complex binding, in accordance with an embodiment of the present invention.

These and other variations of a hardware processor subsystem are also contemplated in accordance with embodiments of the present invention FIG. 2 is a block diagram showing a peptide-MHC protein bond, in accordance with an embodiment of the present invention. A peptide 202 is shown as bonding with an MHC protein 204, with complementary two-dimensional interfaces of the figure suggesting complementary shapes of these three-dimensional structures. The MHC protein 204 may be attached to a cell surface 206.

An MHC is an area on a DNA strand that codes for cell surface proteins that are used by the immune system. MHC molecules are used by the immune system and contribute to the interactions of white blood cells with other cells. For example, MHC proteins impact organ compatibility when performing transplants and are also important to vaccine creation.

A peptide, meanwhile, may be a portion of a protein. When a pathogen presents peptides that are recognized by a MHC protein, the immune system triggers a response to destroy the pathogen. Thus, by finding peptide structures that bind with MHC proteins, an immune response may be intentionally triggered, without introducing the pathogen itself to a body. In particular, given an existing peptide that binds well with the MHC protein 204, a new peptide 202 may be automatically identified according to desired properties and attributes.

Figure 3:
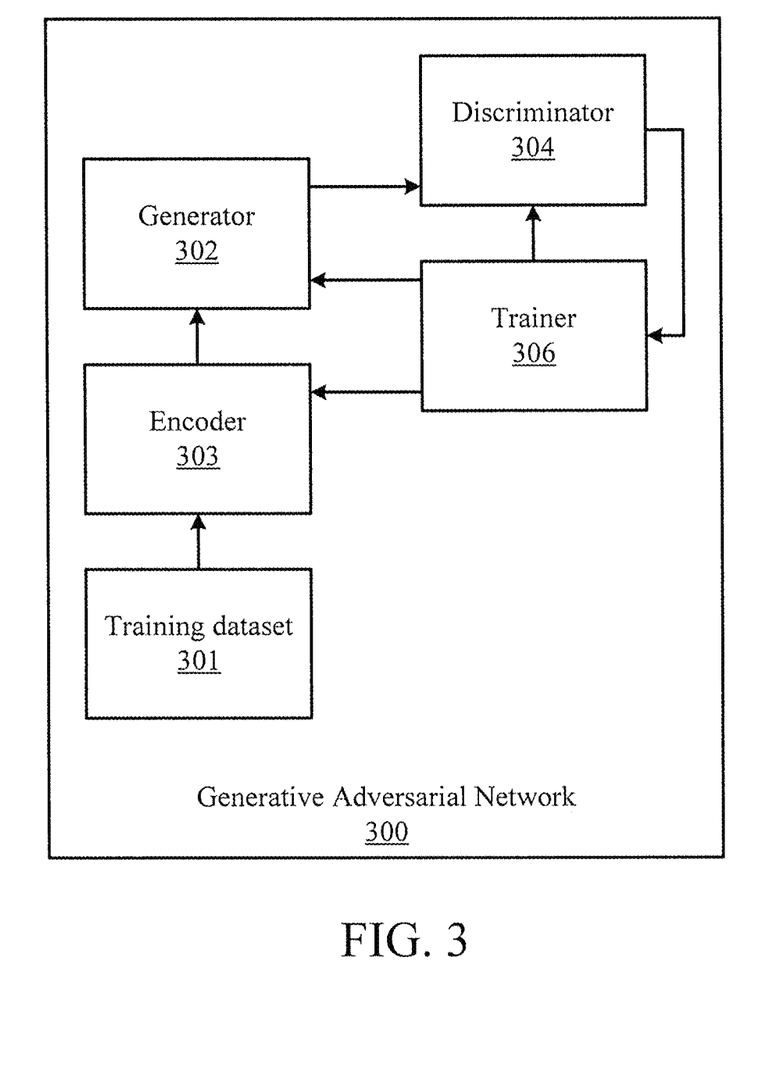
FIG. 3 is a block diagram of a generative adversarial network (GAN) for generating binding peptide sequences, in accordance with an embodiment of the present invention.

FIG. 3 is a block diagram showing an exemplary GAN 300, in accordance with an embodiment of the present invention. The generator 302 generates training dataset candidates, while the discriminator 304 attempts to distinguish between the generated candidates and true samples from a provided training dataset 301. An encoder 303 converts the sequences of the training dataset into vectors in an embedded space. The encoder may use block substitution or a pre-trained amino acid embedding scheme to convert the amino acid sequence into, e.g., a feature representation matrix, with each column of the matrix corresponding to an amino acid. The encoder 303 and the generator 302 may be trained together to fool the discriminator.

The generator 302 is trained to increase the error rate of the discriminator 804, while the discriminator 304 is trained to decrease its error rate in identifying the generated candidates. A trainer 306 uses a loss function to perform training for the generator 302 and the discriminator 304. In a Wasserstein GAN, the loss function may be based on the Wasserstein metric.

In the context of peptide generation, the training dataset 301 may include both binding and nonbinding peptide sequences that interact with an MHC. The generator 302 may be a deep neural network, which transforms a sampled latent code vector z from a multivariate unit-variance Gaussian distribution and a sampled binding class label (e.g., 1 for "binding" and 0 for "non-binding") to a peptide feature representation matrix, with each column corresponding to an amino acid.

The discriminator 304 may be a deep neural network with convolutional layers and fully connected layers between an input representation layer and an output layer that outputs a scalar value. The parameters of the discriminator 304 may be updated to distinguish generated peptide sequences from sampled peptide sequences in the training dataset 301. The parameters of the generator 302 are updated to fool the discriminator 804.

A dual-projection GAN can be used to simultaneously learn two projection vectors, with two cross-entropy losses for each class (e.g., "binding" and "non-binding"). This is equivalent to maximizing the mutual information between generated data examples and their associated labels, with one loss discriminating between real binding/non-binding peptides in the training data and real non-binding/binding peptides in the training data, and the other loss discriminating between generating binding/non-binding peptides and generated non-binding/binding peptides. The generator 302 may be updated to minimize these two cross-entropy losses for each class.

A non-negative scalar weight $\lambda(x)$ may be learned for each data point x associated with the two cross-entropy losses, balancing the discriminator loss. A penalty term of $-0.5 \log(\lambda(x))$ may be added to penalize large values of $\lambda(x)$. Data-label pairs may be denoted as $\{x_i,y_i\}_{i=1}^n \subseteq \chi \times \Gamma$, drawn from a joint distribution $P_{XY}$, where x is a peptide sequence and y is a label. The generator 302 is trained to transform samples $z \sim P_Z$ from a canonical distribution conditioned on labels to match the real data distributions, with real distributions being denoted as P and with generated distributions being denoted as Q. The discriminator 304 learns to distinguish samples drawn from the joint distribution $P_{XY}$ and $Q_{XY}$.

Discriminator and generator loss terms may be written as the following objectives:

$$L_D = \mathbb{E}_{x,y \sim P_{XY}} \mathcal{A}(-\tilde{D}(x,y)) + \mathbb{E}_{z \sim P_Z, y \sim Q_Y} \mathcal{A}(\tilde{D}(G(z,y),y))$$

$$L_G = \mathbb{E}_{z \sim P_Z, y \sim Q_Y} \mathcal{A}(-\tilde{D}(G(z,y),y))$$

where $\mathcal{A}(\cdot)$ is an activation and $\tilde{D}$ is the discriminator's output before activation. The activation function may be $\mathcal{A}(t) = \text{softplus}(t) = \log(1+e^t)$. With this activation function, the logit of an optimal discriminator can be decomposed in two ways:

$$\tilde{D}^*(x,y) = \log\left(\frac{P(x)}{Q(x)}\right) + \log\left(\frac{P(y|x)}{Q(y|x)}\right)$$

$$\tilde{D}^*(x,y) = \log\left(\frac{P(x|y)}{Q(x|y)}\right) + \log\left(\frac{P(y)}{Q(y)}\right)$$

The logic of a projection discriminator can be derived as:

$$\tilde{D}(x,y) = v_y^T \phi(x) + \psi(\phi(x))$$

where $\phi(\cdot)$ is the image embedding function, $v_y$ is an embedding of class y, and $\psi$ collects residual terms. The term $v_y$ can be expressed as a difference of real and generated class embeddings, $v_y = v_y^p - v_y^q$.

Thus, a projection discriminator can tie the parameters $v_y^p$ and $v_y^q$ to a single $v_y$. Tying embeddings can turn the problem of learning categorical decision boundaries into learning a relative translation vector for each class, which is a simpler process. Without loss of generality, the term $\psi(\cdot)$ may be assumed to be a linear function $v_\psi$. The softplus function may be approximated by ReLU=max(0,·), which produces a large loss when $x^+$ and $x^-$ are misclassified. Thus, learning can be performed by alternating the steps:

Discriminator: Align $(v_y + v_\psi)$ with $(\phi(x^+) - \phi(x^-))$
Generator: Move $\phi(x^-)$ along $(v_y + v_\psi)$
By tying the parameters, the GAN can directly perform data matching without explicitly enforcing label matching, aligning Q(x|y) with P(x|y).

The term $v_y$ should recover the difference between the underlying $v_y^p$ and $v_y^q$, but to explicitly enforce that property, the class embeddings may be separated out, and $V^p$ and $V^q$ may be used to learn conditional distributions p(y|x) and q(y|x), respectively. This may be done with the softmax function, and cross-entropy losses may be expressed as:

$$L_{mi}^p = -v_y^{pT}\phi(x^+) + \log\sum_{y'} e^{v_{y'}^{pT}\phi(x^+)}$$

$$L_{mi}^q = -v_y^{qT}\phi(x^-) + \log\sum_{y'} e^{v_{y'}^{qT}\phi(x^-)}$$

$$L_D^{P2} = L_D(\tilde{D}) + L_{mi}^p + L_{mi}^q$$

$$L_D^{P2} = L_G(\tilde{D})$$

$$\tilde{D} = (v_u^p - v_u^q)^T \phi(x) + \psi(\phi(x))$$

where p and q correspond to conditional distribution or loss function using real/generated binding peptides, the terms $v_y^p$ and $v_y^q$ represent embeddings of the real and generated samples, respectively. $\phi(\cdot)$ is an embedding function, $\psi(\cdot)$ collects residual terms, and $x^+ \sim P_X$ and $x^- \sim Q_X$ are real and generated sequences (with P and Q being the respective real and generated distributions), and y is a data label. The classifiers $V^p$ and $V^q$ are trained on real data and generated data, respectively. The discriminator loss $L_D^{P2}$ and generator loss $L_G^{P2}$ trained as above. Both $L_D(\tilde{D})$ and $L_{mi}^p$ include the parameter $V^p$, while $L_D(\tilde{D})$ and $L_{mi}^q$ both include $V^q$.

Data matching and label matching may be weighted by the model. A gate may be added between the two losses:

$$L_D^{P2w} = L_D + \lambda(L_{mi}^p + L_{mi}^q)$$

The definition of $\lambda$ changes the behavior of the system. Variants may include exponential decay, scalar valued, and amortized models. For example, $\lambda$ may be defined as a decaying factor, $$\lambda = e^{-\frac{t}{T}},$$

where t is a training iteration and T is a maximum number of training iterations.

In a scalar valued embodiment, if $\lambda \geq 0$ is a learnable parameter, initialized as 1, class separation may be enforced as long as $\lambda > 0$. A penalty term may be used:

$$L_D^{P2sp} = L_D + \lambda(L_{mi}^p + L_{mi}^q) - \frac{1}{2}\log\lambda$$

In an amortized embodiment, amortized homoscedastic weights may be learned for each data point. The term $\lambda(x) \geq 0$ would then be a function of x producing per-sample weights. A penalty can be added. When loss terms involve non-linearity in the mini-batch expectation, any type of linearization may be applied.

Softmax may be used in the last output layer of the generator 302, with entropy regularization being used to implicitly control the temperature in the tempering softmax units. In a forward pass, a straight-through estimator may be used to output discrete amino acid sequences (e.g., peptides) with "binding" or "non-binding" labels. In the backward pass, the temperatures may be used to facilitate continuation gradient calculations. At the beginning of training, a smaller penalty coefficient may be set for entropy regularization to encourage more uniform amino acid emission probability distributions. Later in training, a larger penalty coefficient may be used for entropy regularization to encourage amino acid emission probability distributions with more peaks.

Besides updating the discriminator 304 and generator 302 in a weighted framework, an encoder may be trained to map an input peptide sequence x to a latent embedding code space z. The aggregated latent codes of the input peptide sequences may be enforced to follow a multivariate unit-variance Gaussian distribution, by minimizing a kernel maximum mean discrepancy regularization term. Each embedding code z is fed into the generator 802 to reconstruct the original peptide sequence x, and the encoder and the generator 802 may be updated by minimizing a cross-entropy loss as the reconstruction error.

During the training, m binding peptide sequences may be randomly sampled from the training set 301. A convex combination of the latent codes of the m peptides may be calculated with randomly sampled coefficients, where $2 \leq m \leq K$ and K is a user-specified hyperparameter. A convex combination may be a positive-weighted linear combination with the sum of the weights equal to 1. The generator 302 generates a binding peptide, and the encoder and generator 302 are updated so that the classifier q(y|x) for the binding class will correctly classify the generated peptide and so the discriminator 304 will classify it as real data.

Figure 4:
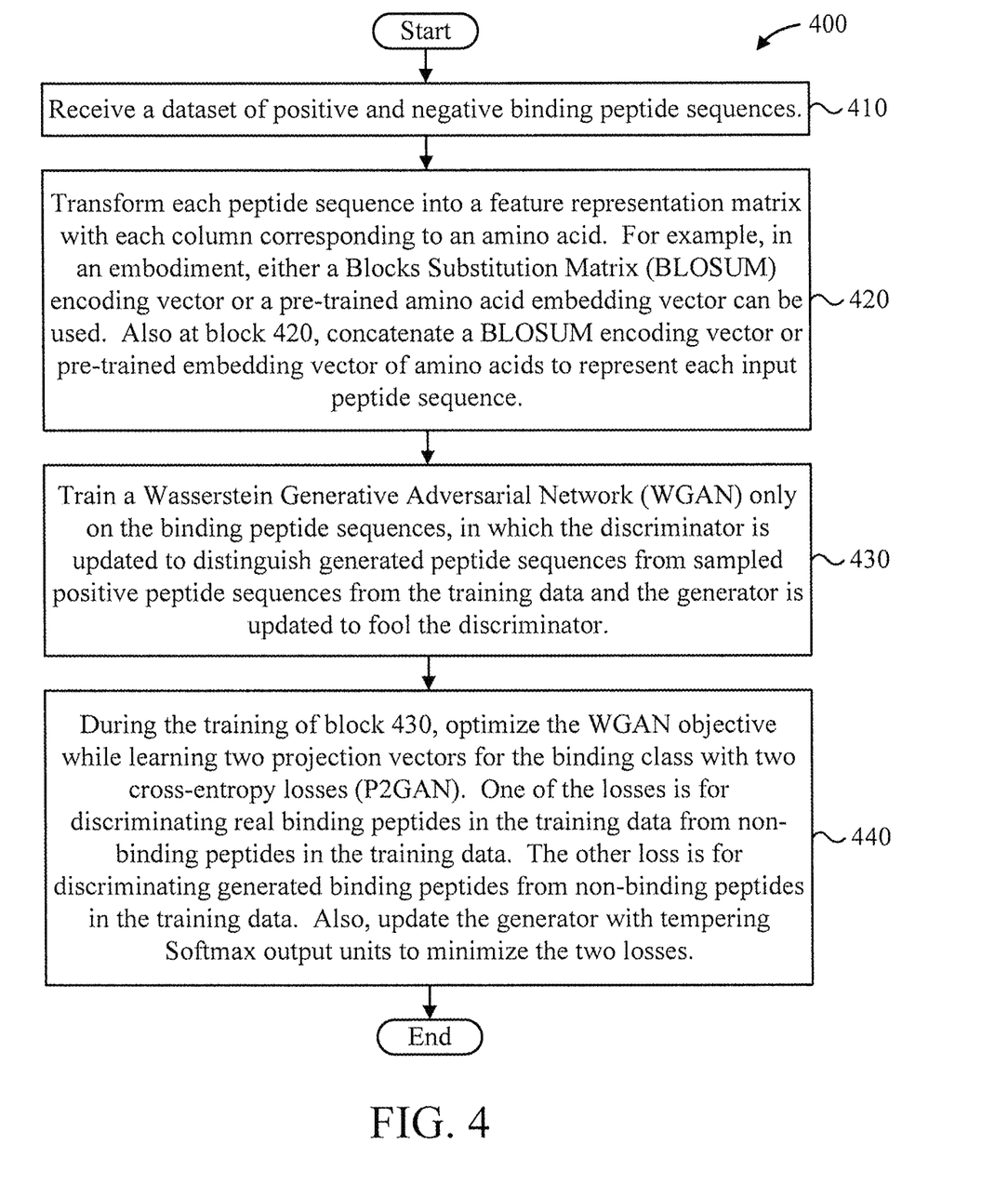
FIG. 4 is a flow diagram showing shows an exemplary method for peptide-based vaccine generation, in accordance with an embodiment of the present invention.

FIG. 4 is a flow diagram showing shows an exemplary method 400 for peptide-based vaccine generation, in accordance with an embodiment of the present invention.

At block 410, receive a dataset of positive and negative binding peptide sequences.

At step 420, transform each peptide sequence into a feature representation matrix with each column corresponding to an amino acid. For example, in an embodiment, either a Blocks Substitution Matrix (BLOSUM) encoding vector or a pre-trained amino acid embedding vector can be used. Also at block 420, concatenate a BLOSUM encoding vector or pre-trained embedding vector of amino acids to represent each input peptide sequence.

At block 430, train a Wasserstein Generative Adversarial Network (WGAN) only on the binding peptide sequences, in which the discriminator is updated to distinguish generated peptide sequences from sampled positive peptide sequences from the training data and the generator is updated to fool the discriminator.

At block 440, during the training of block 430, optimize the WGAN objective while learning two projection vectors for the binding class with two cross-entropy losses (P2GAN). One of the losses is for discriminating real binding peptides in the training data from non-binding peptides in the training data. The other loss is for discriminating generated binding peptides from non-binding peptides in the training data. Also, during the training of block 430, update the generator with tempering Softmax output units to minimize the two losses.

A description will now be further given regarding block 440.

While training (block 430), the present invention simultaneously learns two projection vectors for the binding class with two cross-entropy losses: one for discriminating real binding peptides in the training data from nonbinding peptides in the training data, and the other for discriminating generated binding peptides from nonbinding peptides in the training data. Also while training (block 430), the present invention updates the generator to minimize these two cross-entropy losses. Therefore, the model for binding peptide generation is called "dual projection GAN" or "P2GAN" in short.

One or more embodiments of the present invention employ tempering Softmax units in the last output layer of the peptide generator, and use entropy regularization to implicitly control the temperature in these tempering Softmax units. In the forward pass, a straight-through estimator is used to directly output discrete binding peptides; in the backward pass, these temperatures are used to facilitate continuous gradient calculation. In the beginning of the training, a smaller penalty coefficient is set for the entropy regularization to encourage more uniform amino-acid emission probability distributions. In the later phase of the training, a larger penalty coefficient is set for the entropy regularization to encourage peakier amino-acid emission probability distributions.

Figure 5:
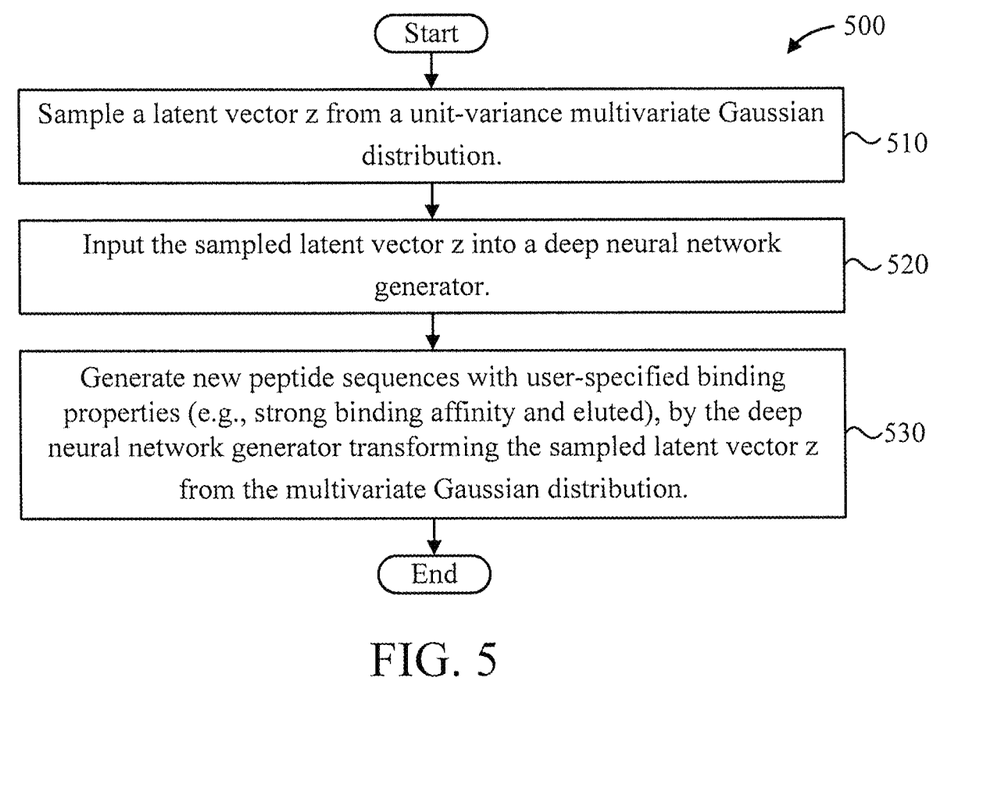
FIG. 5 is a flow diagram showing an exemplary inference method for peptide-based vaccine generation, in accordance with an embodiment of the present invention.

FIG. 5 is a flow diagram showing an exemplary inference method 500 for peptide-based vaccine generation, in accordance with an embodiment of the present invention.

At block 510, sample a latent vector z from a unit-variance multivariate Gaussian distribution.

At block 520, input the sampled latent vector z into a deep neural network generator.

At block 530, generate new peptide sequences with user-specified binding properties (e.g., strong binding affinity and eluted), by the deep neural network generator transforming the sampled latent vector z from the multivariate Gaussian distribution.

A vaccine can be administer based on the results of block 530.

Figure 6:
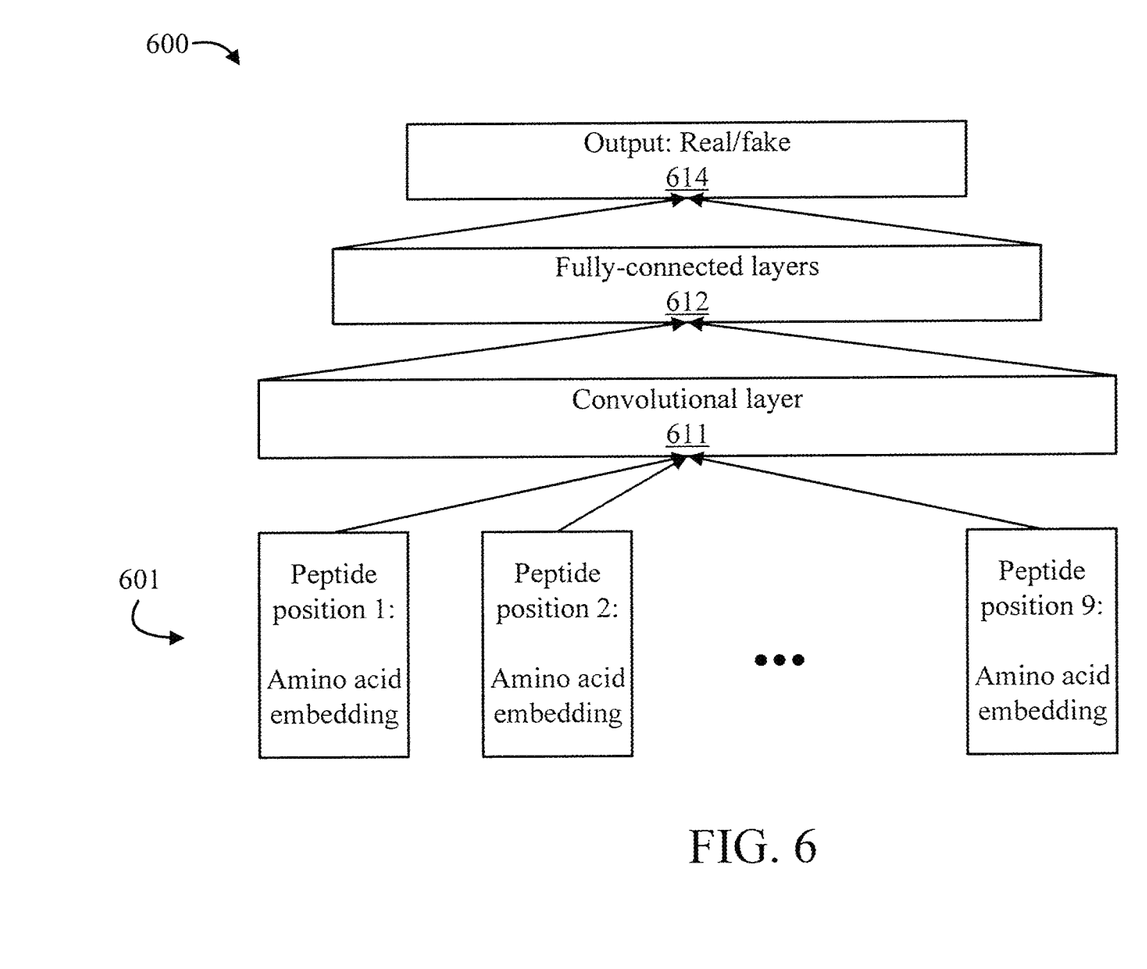
FIG. 6 is a block diagram showing an exemplary discriminator, in accordance with an embodiment of the present invention.

FIG. 6 is a block diagram showing an exemplary discriminator 600, in accordance with an embodiment of the present invention. Discriminator 600 can be discriminator 304 in FIG. 3.

The discriminator 600 receives an input peptide sequence matrix with amino acid embeddings 601, and includes a convolutional layer 611, fully connected layers 612, and an output layer 614 outputting real/fake sequences. The input peptide sequence matrix is a d-by-n matrix, in which n is the length of the input peptide (for example, n=9 for most MHC Class I positive binding peptides), d is a user-specified dimensionality of amino acid embedding vectors, and the i-th column of the matrix correspond to the embedding vector of the i-th amino acid in the input peptide sequence.

Figure 7:
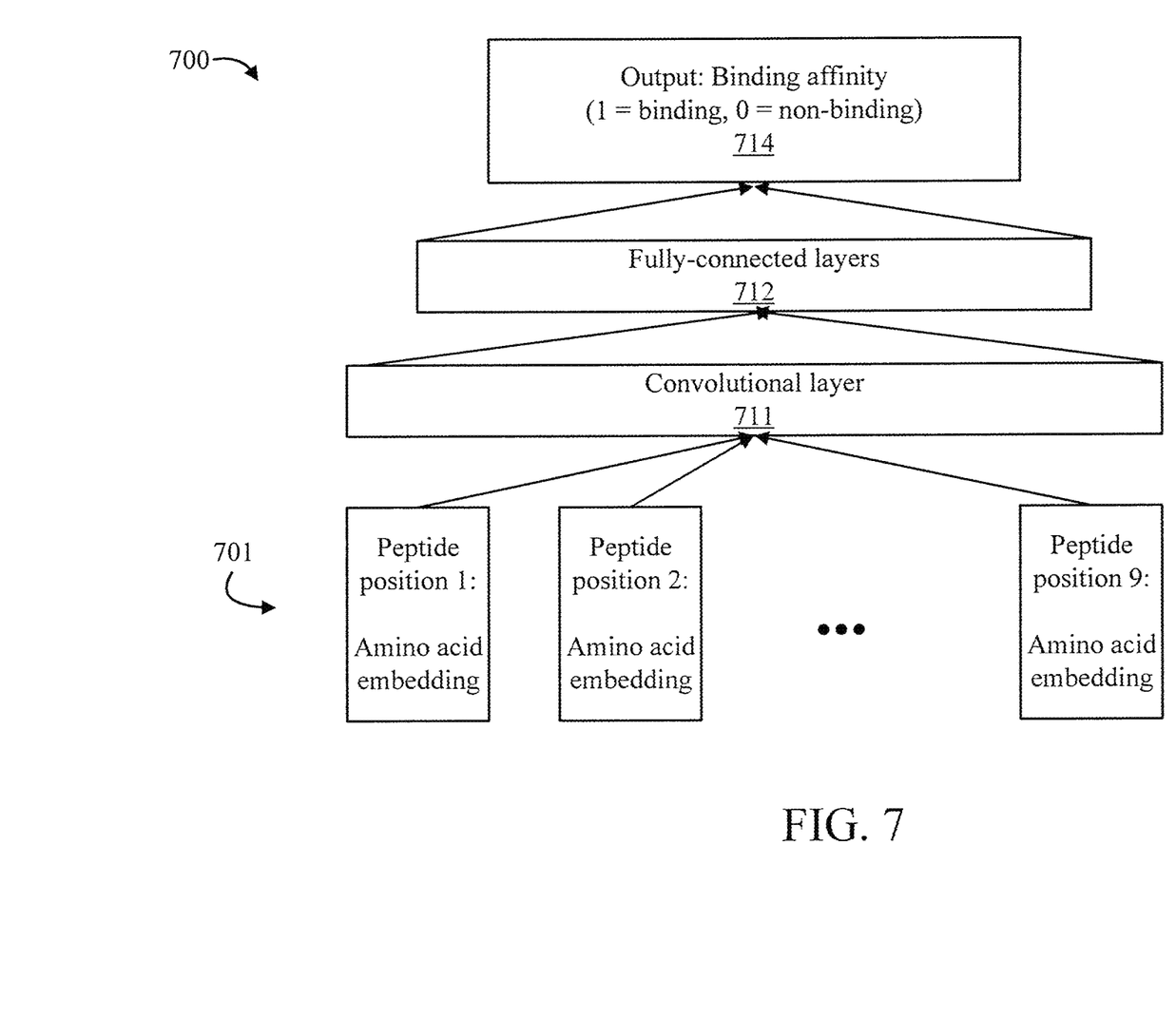
FIG. 7 is a block diagram showing an exemplary property predictor, in accordance with an embodiment of the present invention.

FIG. 7 is a block diagram showing an exemplary property predictor 700, in accordance with an embodiment of the present invention.

The property predictor 700 receives an input peptide sequence matrix with amino acid embeddings 701, and includes a convolutional layer 711, fully connected layers 712, and an output layer 714 outputting a binding affinity. The input peptide sequence matrix is a d-by-n matrix, in which n is the length of the input peptide (for example, n=9 for most MHC Class I binding peptides), d is a user-specified dimensionality of amino acid embedding vectors, and the i-th column of the matrix correspond to the embedding vector of the i-th amino acid in the input peptide sequence.

Figure 8:
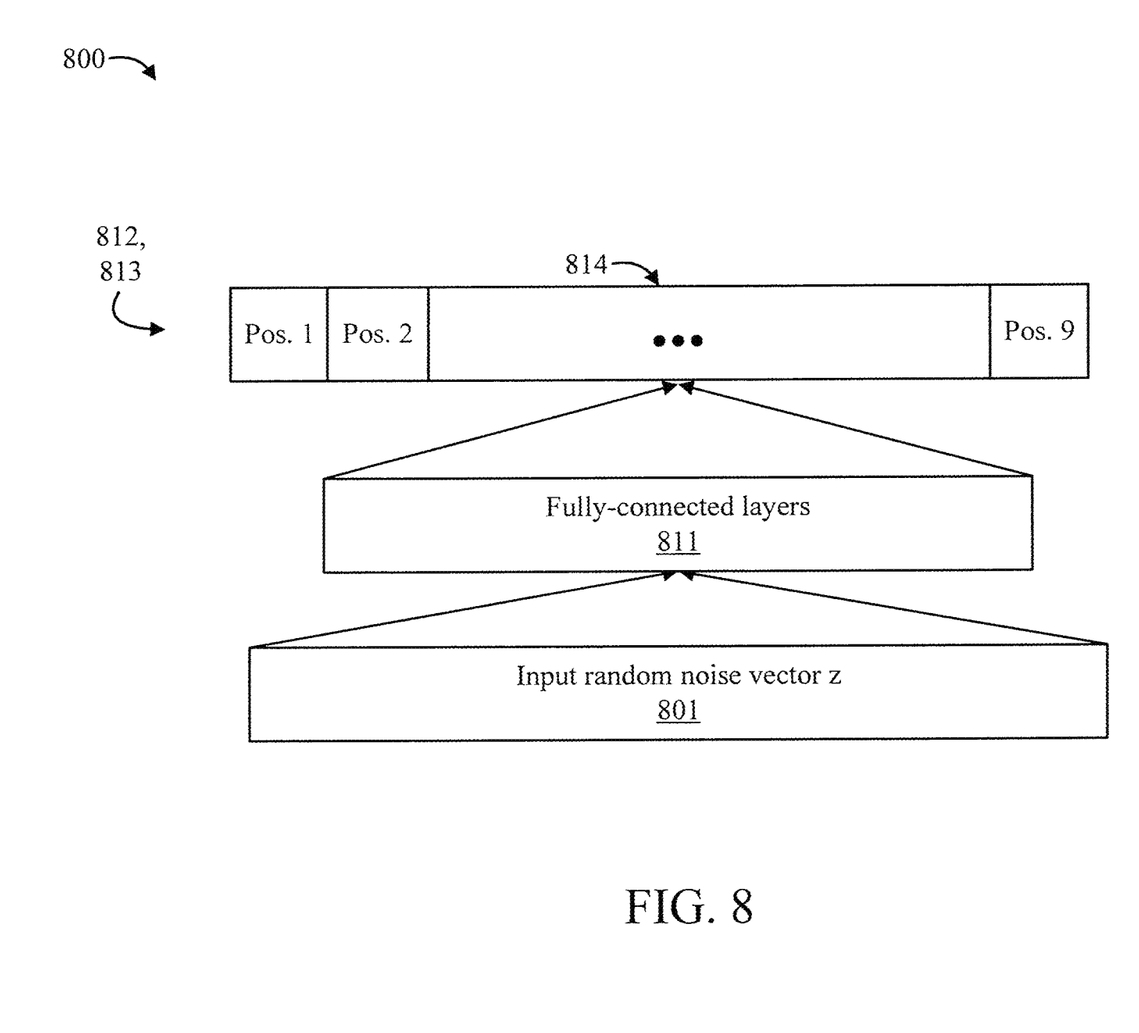
FIG. 8 is a block diagram showing an exemplary generator, in accordance with an embodiment of the present invention.

FIG. 8 is a block diagram showing an exemplary generator 800, in accordance with an embodiment of the present invention. Discriminator 800 can be discriminator 302 in FIG. 3.

The generator 800 receives an input random noise vector z 801, and includes fully connected layers 811, and an output layer 812 outputting softmax output units 813. The softmax output units 813 are concatenated into a Peptide sequence 814. Specifically, to generate a peptide sequence with length n, we have n output softmax units with each unit corresponding to a position in the peptide sequence. Each softmax unit outputs 20 probabilities summing to 1, which denotes the emitting probabilities of 20 amino acids. Ideally, in a softmax unit i corresponding to position i of a positive binding peptide sequence, the emitting probability of the ground-truth amino acid should be close to 1, and all the other 19 emitting probabilities of this softmax unit should be close to 0.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for generating new binding peptides to Major Histocompatibility Complex (MHC) proteins, comprising:
   training, by a processor device, a Generative Adversarial Network (GAN) having a generator and a discriminator only on a set of binding peptide sequences given training data comprising the set of binding peptide sequences and a set of non-binding peptide sequences, wherein a GAN training objective comprises the discriminator being iteratively updated to distinguish generated peptide sequences from sampled binding peptide sequences as fake or real and the generator being iteratively updated to fool the discriminator;
   generating new peptide sequences with user-specified binding properties to create a vaccine based on the trained GAN; and
   administering the vaccine,
   wherein said training comprises learning two projection vectors for a binding class by optimizing a GAN training objective that combines two cross-entropy losses, a first of the two cross-entropy losses discriminating binding peptide sequences in the training data from non-binding peptide sequences in the training data, and a second of the two cross-entropy losses discriminating generated binding peptide sequences from non-binding peptide sequences in the training data.

2. The computer-implemented method of claim 1, wherein the GAN is a Wasserstein GAN.

3. The computer-implemented method of claim 1, wherein said training further comprises updating the generator with tempering Softmax units to minimize the two cross-entropy losses.

4. The computer-implemented method of claim 3, wherein the tempering Softmax units are employed with entropy regularization for implicit temperature control of the tempering Softmax units.

5. The computer-implemented method of claim 1, wherein the generator is a deep neural network, comprising a convolutional layer for receiving the set of binding peptide sequences.

6. The computer-implemented method of claim 1, wherein the GAN operates on sampled latent code vectors from a multivariate Gaussian distribution obtained from the training data.

7. The computer-implemented method of claim 1, wherein the two cross-entropy losses are implemented by dual classifiers.

8. The computer-implemented method of claim 1, wherein the new peptide sequences are output from the generator as Softmax output units, and wherein the generator comprises a fully-connected layer for receiving an input random noise vector and another fully-connected layer for outputting the Softmax output units.

9. A computer program product for generating new binding peptides to Major Histocompatibility Complex (MHC) proteins, the computer program product comprising a non-transitory computer readable storage medium having program instructions embodied therewith, the program instructions executable by a computer to cause the computer to perform a method comprising:
   training, by a processor device of the computer, a Generative Adversarial Network (GAN) having a generator and a discriminator only on a set of binding peptide sequences given training data comprising the set of binding peptide sequences and a set of non-binding peptide sequences, wherein a GAN training objective comprises the discriminator being iteratively updated to distinguish generated peptide sequences from sampled positive peptide sequences as fake or real and the generator being iteratively updated to fool the discriminator;
   generating new peptide sequences with user-specified binding properties to create a vaccine based on the trained GNA; and
   administering the vaccine,
   wherein said training comprises learning two projection vectors for a binding class by optimizing a GAN training objective that combines two cross-entropy losses, a first of the two cross-entropy losses discriminating binding peptide sequences in the training data from non-binding peptide sequences in the training data, and a second of the two cross-entropy losses discriminating generated binding peptide sequences from non-binding peptide sequences in the training data.

10. The computer program product of claim 9, wherein the GAN is a Wasserstein GAN.

11. The computer program product of claim 9, wherein said training further comprises updating the generator with tempering Softmax units to minimize the two cross-entropy losses.

12. The computer program product of claim 11, wherein the tempering Softmax units are employed with entropy regularization for implicit temperature control of the tempering Softmax units.

13. The computer program product of claim 9, wherein the generator is a deep neural network, comprising a convolutional layer for receiving the set of binding peptide sequences.

14. The computer program product of claim 9, wherein the GAN operates on sampled latent code vectors from a multivariate Gaussian distribution obtained from the training data.

15. The computer program product of claim 9, wherein the two cross-entropy losses are implemented by dual classifiers.

16. The computer program product of claim 9, wherein the new peptide sequences are output from the generator as Softmax output units, and wherein the generator comprises a fully-connected layer for receiving an input random noise vector and another fully-connected layer for outputting the Softmax output units.

17. A computer processing system for generating new binding peptides to Major Histocompatibility Complex (MHC) proteins, comprising:
 a memory device for storing program code; and
 a processor device, operatively coupled to the memory device, for running the program code to:
  train a Generative Adversarial Network (GAN) having a generator and a discriminator only on a set of binding peptide sequences given training data comprising the set of binding peptide sequences and a set of non-binding peptide sequences, wherein a GAN training objective comprises the discriminator being iteratively updated to distinguish generated peptide sequences from sampled positive binding peptide sequences as fake or real and the generator being iteratively updated to fool the discriminator;
  generate new peptide sequences with user-specified binding properties to create a vaccine based on the trained GAN; and
  administer the vaccine,
 wherein, during training, the processor device further runs the program code to learn two projection vectors for a binding class by optimizing a GAN training objective that combines two cross-entropy losses, a first of the two cross-entropy losses discriminating binding peptide sequences in the training data from non-binding peptide sequences in the training data, and a second of the two cross-entropy losses discriminating generated binding peptide sequences from non-binding peptide sequences in the training data.

18. The computer processing system of claim 17, wherein said processor device further runs the program code to use the generated positive binding peptides as additional positive training data to improve a performance of a classifier discriminating binding peptides from non-binding peptides.

19. The computer-implemented method of claim 1, wherein the cross-entropy losses are expressed as:

$$L_{mi}^{p} = -v_{y}^{pT} \phi(x^{+}) + \log \sum_{y'} e^{v_{y'}^{pT} \phi(x^{+})}$$

$$L_{mi}^{q} = -v_{y}^{qT} \phi(x^{-}) + \log \sum_{y'} e^{v_{y'}^{qT} \phi(x^{-})}$$

where p and q correspond to conditional distribution or loss function using real/generated binding peptides, the terms $v_y^p$ and $v_y^q$ represent embeddings of the real and generated samples, respectively, $\phi(\cdot)$ is an embedding function, $x^+ \sim P_X$ and $x^- \sim Q_X$ are real and generated sequences (with P and Q being the respective real and generated distributions), and y is a data label.

* * * * *